United States Patent
Hsu

Patent Number: 6,010,651
Date of Patent: Jan. 4, 2000

[54] LATEX LEATHER SHEET FABRICATION METHOD

[76] Inventor: Chin-Chao Hsu, 4F., No. 14, Lane 42, Yi Hsien Road, Taipei, Taiwan

[21] Appl. No.: 09/176,303

[22] Filed: Oct. 22, 1998

[51] Int. Cl.[7] .................................................. B29C 44/02
[52] U.S. Cl. .............................. 264/50; 264/234; 264/345
[58] Field of Search ............................... 264/50, 234, 345

[56] References Cited

U.S. PATENT DOCUMENTS

| | | | |
|---|---|---|---|
| 1,990,460 | 2/1935 | Minor | 264/50 |
| 2,131,073 | 9/1938 | Roberts et al. | 264/50 |
| 2,156,508 | 5/1939 | Minor | 264/50 |
| 2,216,785 | 10/1940 | Roberts | 264/50 |
| 2,290,736 | 7/1942 | Buffington et al. | 264/50 |
| 2,307,082 | 1/1943 | Te Grotenhuis | 264/50 |
| 2,309,005 | 1/1943 | Ogilby | 264/50 |
| 2,809,172 | 10/1957 | Keen | 264/50 |
| 2,832,997 | 5/1958 | Bristol | 264/50 |
| 2,845,659 | 8/1958 | Calvert | 264/50 |
| 2,858,282 | 10/1958 | Fairclough | 264/50 |
| 3,642,392 | 2/1972 | Vanderhagen | 264/50 |
| 3,650,995 | 3/1972 | Erickson | 264/50 |
| 4,425,291 | 1/1984 | Beer et al. | 264/50 |
| 4,500,591 | 2/1985 | Peltier et al. | 264/50 |

FOREIGN PATENT DOCUMENTS

| | | | |
|---|---|---|---|
| 1009727 | 11/1965 | United Kingdom | 264/50 |
| 1151064 | 5/1969 | United Kingdom | 264/50 |

*Primary Examiner*—Allan R. Kuhns
*Attorney, Agent, or Firm*—Robert E. Bushnell, Esq.

[57] ABSTRACT

A latex leather sheet fabrication method includes the steps of (a) pre-heating natural latex to about 30° C.; (b) flow mixing pre-heated natural latex with a chemical solution containing oleic acid, sulfur and zinc oxide powder by flow mixing for about 1~3 hours; (c) mixing the latex mixture with forced air into a foamed viscous liquid; (d) shape-forming the foamed viscous liquid into a hardened foamed sheet material; (e) heating and drying the foamed sheet material into a foamed leather sheet; and (f) air cooling the finished latex leather sheet.

2 Claims, 5 Drawing Sheets

LATEX LEATHER SHEET FABRICATION METHOD

BACKGROUND OF THE INVENTION

The present invention relates to a latex leather sheet fabrication method, and more particularly to such a latex leather sheet fabrication method which comprises the step of mixing pre-heated natural latex with a chemical solution, the step of mixing the latex mixture with forced air into a foamed viscous liquid, the step of shape-forming the foamed viscous liquid into a hardened foamed sheet material, the step of heating and drying the foamed sheet material into a foamed leather sheet, and the step of air cooling the finished latex leather sheet.

A latex sponge is made by: mixing natural latex with liquefied styrene-butadiene rubber and a chemical solution containing oleic acid, sulfur and zinc oxide powder for at least 24 hours, then processing the liquefied latex mixture into a foamed sheet material through a foaming process, and then heating and drying the foamed sheet material into a latex leather sheet, and then cooling down the finished latex leather sheet by cooling air. Because natural latex is sensitive to temperature and humidity, it is difficult to process natural latex into foamed material. Mixing natural latex with liquefied styrene-butadiene rubber and the aforesaid chemical solution greatly improves the stability of the material properties of natural latex. However, when liquefied latex mixture is applied to a shape-forming implement, it is difficult to keep liquefied latex mixture in a uniform thickness. Because the foamed sheet material is heated into a latex leather sheet in a heating oven at a constant temperature, the bottom layer of the foamed sheet material may be overheated when the intermediate layer of the foamed sheet material still contains moisture. Therefore, it is difficult to control the quality of finished products according to the aforesaid prior art sponge fabrication method.

SUMMARY OF THE INVENTION

The present invention provides a method of fabricating latex leather sheet by: pre-heating natural latex to about 30° C., then flow mixing pre-heated natural latex with a chemical solution containing oleic acid, sulfur and zinc oxide powder by flow mixing for about 1~3 hours, and then mixing the latex mixture with forced air into a foamed viscous liquid, and then shape-forming the foamed viscous liquid into a hardened foamed sheet material by means of a shape-forming implement being heated to about 50° C., and then heating and drying the foamed sheet material into a foamed leather sheet, and then air cooling the finished latex leather sheet.

DETAILED DESCRIPTION OF THE PREFERRED EMBODIMENT

Figure 1:
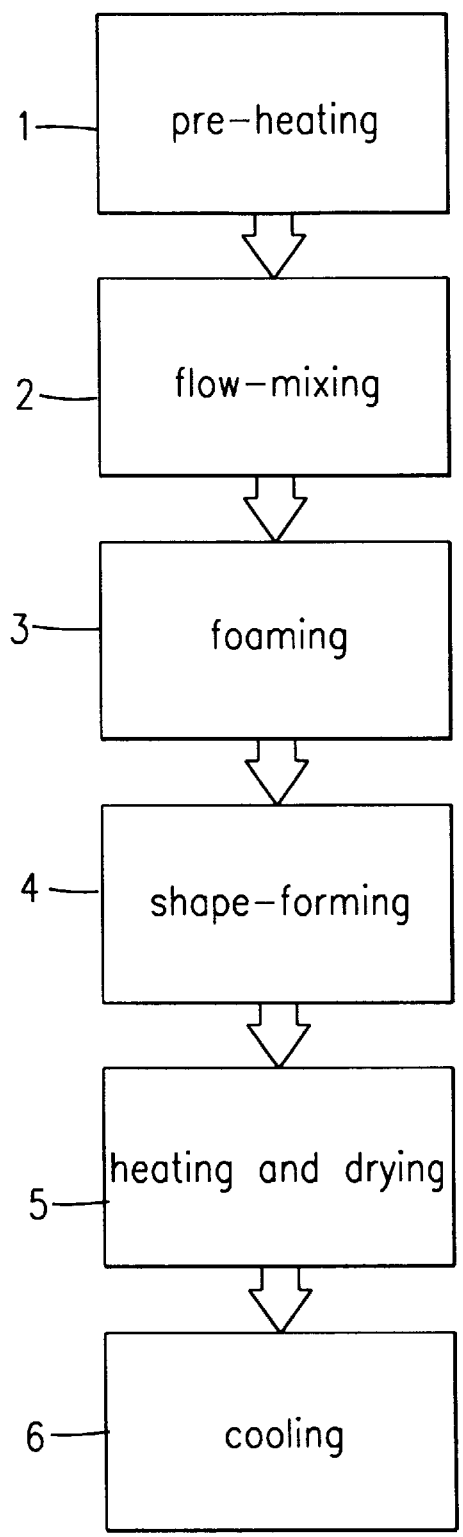
FIG. 1 is a latex leather sheet fabrication block diagram according to the present invention.

Referring to FIG. 1, a latex leather sheet fabrication method in accordance with the present invention comprises the steps of:

(a) pre-heating, in which natural latex is pre-heated to about 30° C.;

(b) flow mixing, in which pre-heated natural latex is mixed with a chemical solution (which contains oleic acid, sulfur and zinc oxide powder) by flow mixing for about 1~3 hours;

(c) foaming, in which air is forced into the latex mixture thus obtained, enabling the latex mixture to be mixed with forced air into a foamed viscous liquid;

(d) shape-forming, in which the foamed viscous liquid thus obtained is applied to a shape forming implement, which is heated to about 50° C., enabling the foamed viscous liquid to be gradually hardened from the bottom side toward the top side, forming into a hardened foamed sheet material, and at the same time the surface temperature of the applied foamed viscous liquid is cooled down by a plain cutter;

(e) heating and drying, in which the hardened foamed sheet material thus obtained is heated in a heating oven at different temperatures and then dried into a foamed leather sheet through a drying process; and (f) cooling, in which the well dried foamed leather sheet is cooled down.

Figure 2:
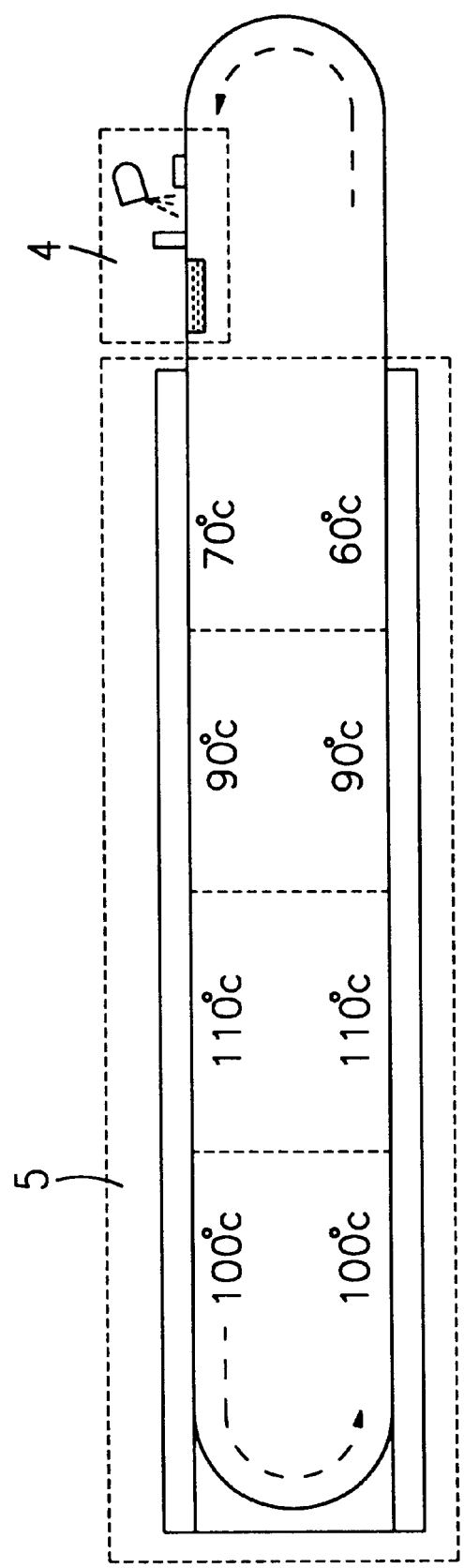
FIG. 2 is a flow chart illustrating the fabrication step of shape-forming and the step of heating and drying according to the present invention.
Figure 3:
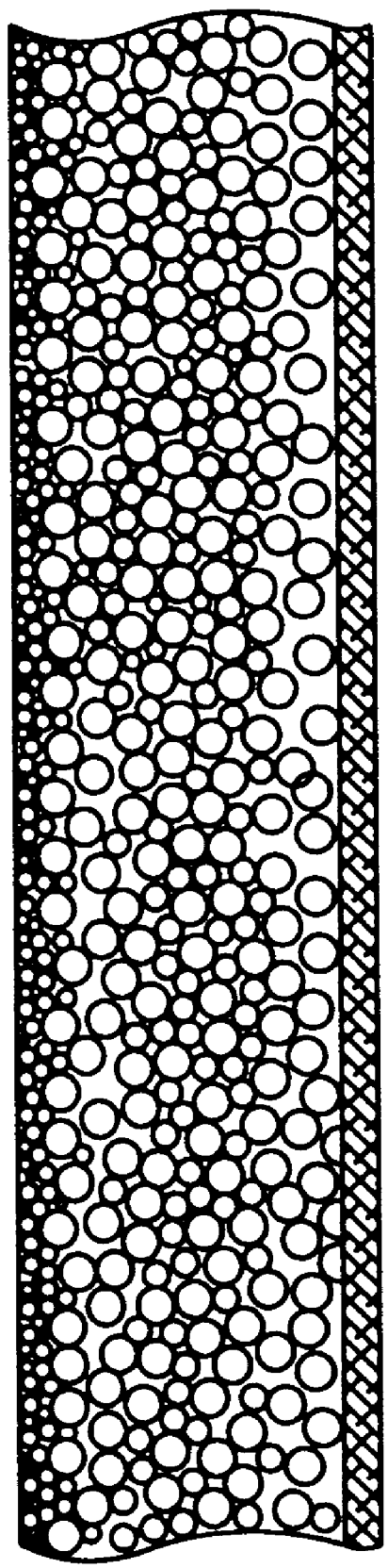
FIG. 3 is a sectional view of a latex leather sheet made according to the present invention.

Referring to FIGS. 2 and 3 and FIG. 1 again, natural latex is delivered through a heating tube, and then filled in a mixing container to mix with a chemical solution containing oleic acid, sulfur and zinc oxide powder for about 1~3 hours. When passing through the heating tube, natural latex is heated to about 30° C. After natural latex has been well mixed with the chemical solution, air is forced into the mixing container, and mixed with the liquefied latex mixture, causing the liquefied latex mixture to be changed into a foamed viscous liquid. The foamed viscous liquid is then applied to a shape forming implement, which is heated to about 50° C., enabling the foamed viscous liquid to be gradually hardened from the bottom side toward the top side, forming into a hardened foamed sheet material, and at the same time the surface temperature of the applied foamed viscous liquid is cooled down by a plain cutter. The hardened foamed sheet material is then carried with the shape forming implement into a heating oven and heated at 70° C. to reinforce the air cells in the foamed sheet material, then heated at 90° C. and then at 110° C. to remove moisture from the foamed sheet material, and then heated at 100° C. to set the shape, then heated at 110° C. again to remove remaining moisture, and then heated at 90° C. and then at 60° C., and then removed from the heating oven, so as to obtain a foamed leather sheet. Then, cooling air is applied to the foamed leather sheet, to force residual oxide away from the air cells of the foamed leather sheet. The aforesaid step (d) shape-forming and step (e) heating and drying can be repeated when making a multi-layer latex leather sheet.

Figure 4:
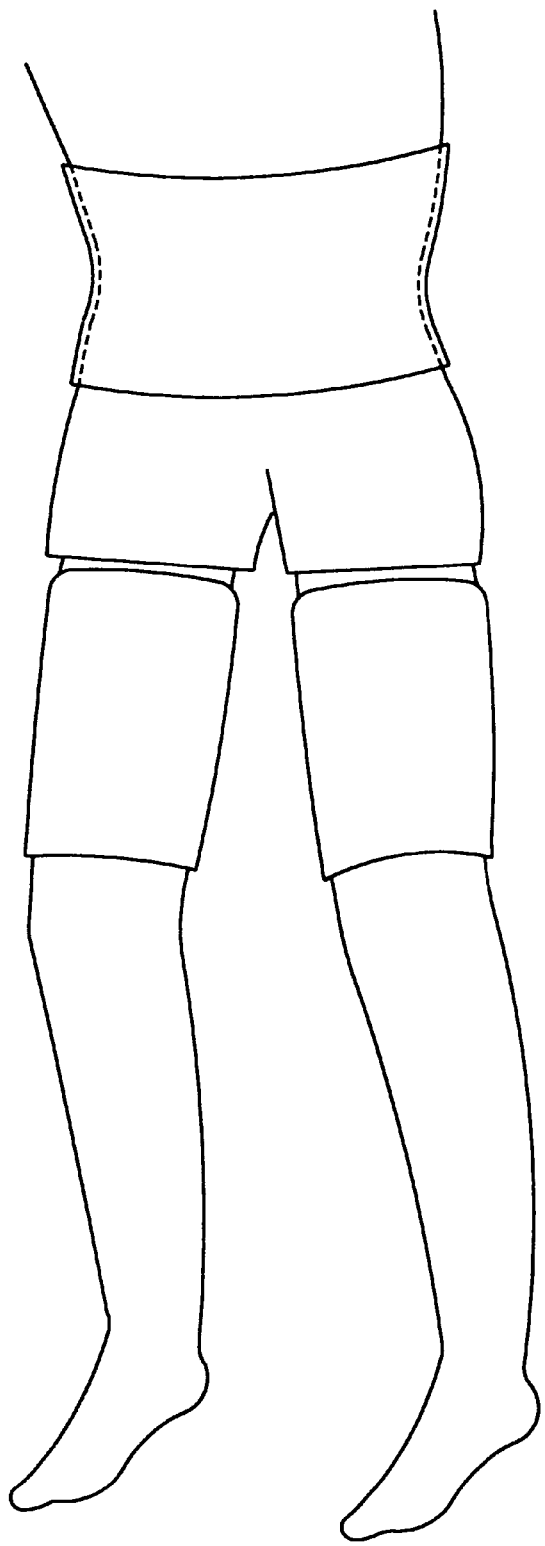
FIG. 4 illustrates application examples of the latex leather sheet according to the present invention.
Figure 5:
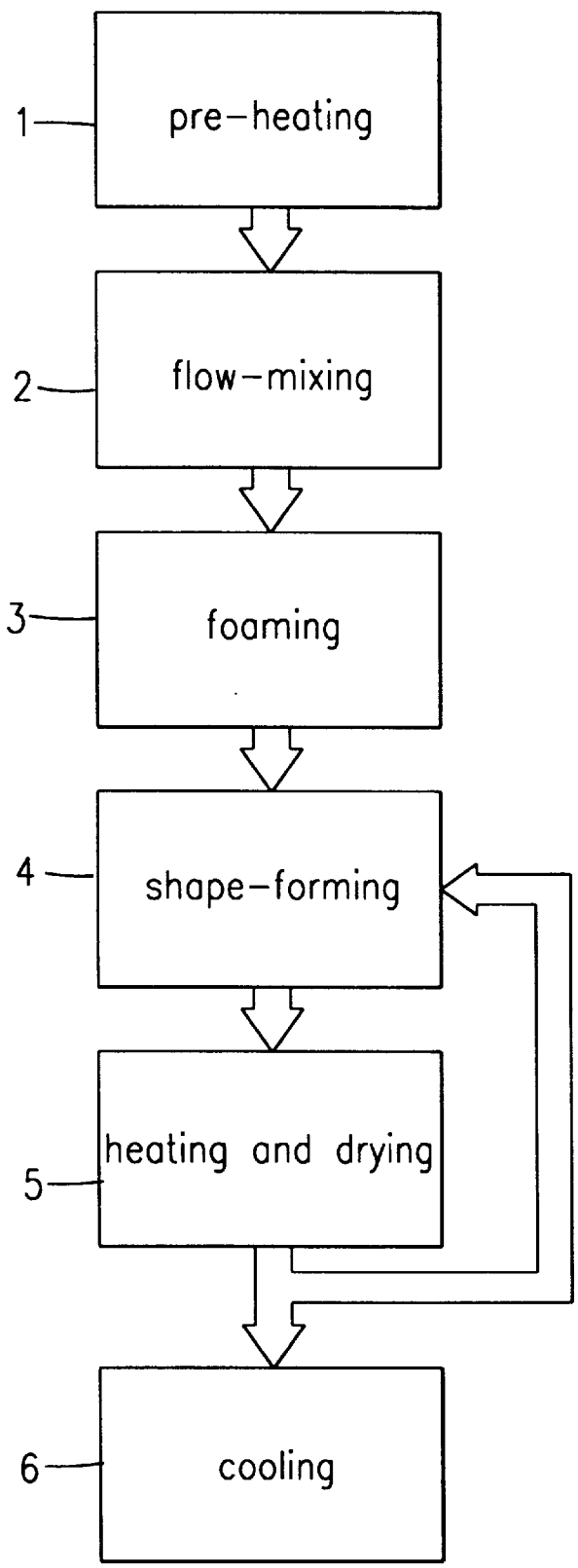
FIG. 5 illustrates an alternate form of the latex leather sheet fabrication block diagram according to the present invention.

Referring to FIGS. 4 and 5, a latex leather sheet made according to the aforesaid fabrication method can be used for making waist padding, knee padding, sportswear, etc. By means of repeating the aforesaid step (d) shape-forming and step (e) heating and drying, a multi-layer latex leather sheet can be obtained for making diving suit, swimming suit, rainwear, and any of a variety of sportswear.

What the invention claimed is:

1. A latex leather sheet fabrication method comprising the steps of:

(a) pre-heating, in which natural latex is pre-heated to about 30° C.;

(b) flow mixing, in which pre-heated natural latex is mixed with a chemical solution (which contains oleic acid, sulfur and zinc oxide powder) by flow mixing for about 1~3 hours;

(c) foaming, in which air is forced into the latex mixture thus obtained, enabling the latex mixture to be mixed with forced air into a foamed viscous liquid;

(d) shape-forming, in which the foamed viscous liquid thus obtained is applied to a shape forming implement, which is heated to about 50° C., enabling the foamed viscous liquid to be gradually hardened from the bottom side toward the top side, forming into a hardened foamed sheet material, and at the same time the surface temperature of the applied foamed viscous liquid is cooled down by a plain cutter;

(e) heating and drying, in which the hardened foamed sheet material thus obtained is heated in a heating oven at different temperatures and then dried into a foamed leather sheet through a drying process; and (f) cooling, in which the well dried foamed leather sheet is cooled down.

2. The latex leather sheet fabrication method of claim 1 further comprising the step of repeating the step of (d) shape-forming and the step of (e) heating and drying before the step of (f) cooling.

* * * * *